United States Patent
Kobayashi

(10) Patent No.: US 12,535,661 B2
(45) Date of Patent: Jan. 27, 2026

(54) OPTICAL SYSTEM AND IMAGE PICKUP APPARATUS HAVING THE SAME

(71) Applicant: CANON KABUSHIKI KAISHA, Tokyo (JP)

(72) Inventor: Kana Kobayashi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 641 days.

(21) Appl. No.: 17/965,898

(22) Filed: Oct. 14, 2022

(65) Prior Publication Data

US 2023/0124227 A1    Apr. 20, 2023

(30) Foreign Application Priority Data

Oct. 20, 2021    (JP) .................................. 2021-171417

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01); *G02B 13/0035* (2013.01); *G02B 13/004* (2013.01)

(58) Field of Classification Search
CPC ........ G02B 13/0045; G02B 9/62; G02B 9/64; G02B 13/0035; G02B 13/004; G02B 13/008
USPC .......................................................... 359/357
See application file for complete search history.

(56) References Cited

U.S. PATENT DOCUMENTS

| | | | |
|---|---|---|---|
| 10,488,624 B2 * | 11/2019 | Wang | G02B 9/64 |
| 2017/0248772 A1 * | 8/2017 | Tang | G02B 5/208 |
| 2020/0209565 A1 * | 7/2020 | Guo | G02B 27/005 |
| 2020/0209587 A1 * | 7/2020 | Wang | G02B 13/0045 |
| 2020/0209588 A1 * | 7/2020 | Wang | G02B 13/0045 |
| 2020/0409062 A1 * | 12/2020 | Yamazaki | G02B 13/18 |
| 2021/0232038 A1 | 7/2021 | Kobayashi | |
| 2023/0161135 A1 * | 5/2023 | Lee | G02B 9/62 |
| | | | 359/756 |
| 2023/0314771 A1 * | 10/2023 | Hsueh | G02B 9/64 |
| | | | 359/708 |

FOREIGN PATENT DOCUMENTS

| | | |
|---|---|---|
| CN | 110850552 A | 2/2020 |
| JP | 2005352471 A | 12/2005 |
| JP | 2015176002 A | 10/2015 |
| JP | 6546656 B2 | 7/2019 |

(Continued)

OTHER PUBLICATIONS

Notice of Reasons for Refusal issued by the Japanese Patent Office on Aug. 5, 2025 in corresponding JP Patent Application No. 2021-171417, with English translation.

*Primary Examiner* — George G. King
*Assistant Examiner* — Natasha Nigam
(74) *Attorney, Agent, or Firm* — Carter, DeLuca & Farrell LLP

(57) ABSTRACT

An optical system consists of, in order from an object side to an image side, a lens unit including a plurality of lenses and a final lens having a negative refractive power. A lens surface on the image side of the final lens has an aspherical shape that includes a concave area near an optical axis and an inflection point. A predetermined condition is satisfied.

19 Claims, 6 Drawing Sheets

(56) References Cited

FOREIGN PATENT DOCUMENTS

| | | | |
|---|---|---|---|
| JP | 2019109480 | A | 7/2019 |
| JP | 2019144293 | A | 8/2019 |
| JP | 2020016788 | A | 1/2020 |
| JP | 2020109471 | A | 7/2020 |
| JP | 2021032959 | A | 3/2021 |
| JP | 2021124630 | A | 8/2021 |

\* cited by examiner

OPTICAL SYSTEM AND IMAGE PICKUP APPARATUS HAVING THE SAME

BACKGROUND

Technical Field

The disclosure relates to an optical system, which is suitable for a digital video camera, a digital still camera, a broadcasting camera, a film-based camera, a surveillance camera, an in-vehicle camera, and the like.

Description of the Related Art

The image pickup apparatus using a solid-state image sensor, such as the digital camera, the surveillance camera, and the in-vehicle camera, is required to have a compact optical system with good optical performance from the center to the periphery of the angle of view and a short overall length. In particular, the surveillance camera and in-vehicle camera are required to have a bright optical system having a small F-number (Fno) for imaging even in a dark place. However, an aperture diameter of the bright optical system is likely to be large.

It is difficult to correct aberrations, in particular, curvature of field and spherical aberration in the optical system having the large aperture diameter. In order to correct them, the optical system is likely to be large.

Japanese Patent No. ("JP") 6546656 discloses a bright optical system that consists of, in order from an object side to an image side, a first lens unit having a negative refractive power, a second lens unit having a positive refractive power, and a third lens unit having a positive refractive power.

However, the optical system disclosed in JP 6546656 has a relatively small Fno and good optical performance in the periphery of the angle of view, but is insufficient in terms of miniaturization.

SUMMARY

The disclosure provides a compact optical system having a large aperture and good optical performance from a center to a periphery of an angle of view.

An optical system according to one aspect of this disclosure consists of, in order from an object side to an image side, a lens unit including a plurality of lenses and a final lens having a negative refractive power. A lens surface on the image side of the final lens has an aspherical shape that includes a concave area near an optical axis of the optical system and an inflection point. The following inequality is satisfied:

$$1.780 < Nd < 2.500$$

where Nd is an average value of refractive indexes of all lenses included in the lens unit. An image pickup apparatus having the above optical system also constitutes another aspect of the disclosure.

Further features of the disclosure will become apparent from the following description of exemplary embodiments with reference to the attached drawings.

DESCRIPTION OF THE EMBODIMENTS

Figure 1:
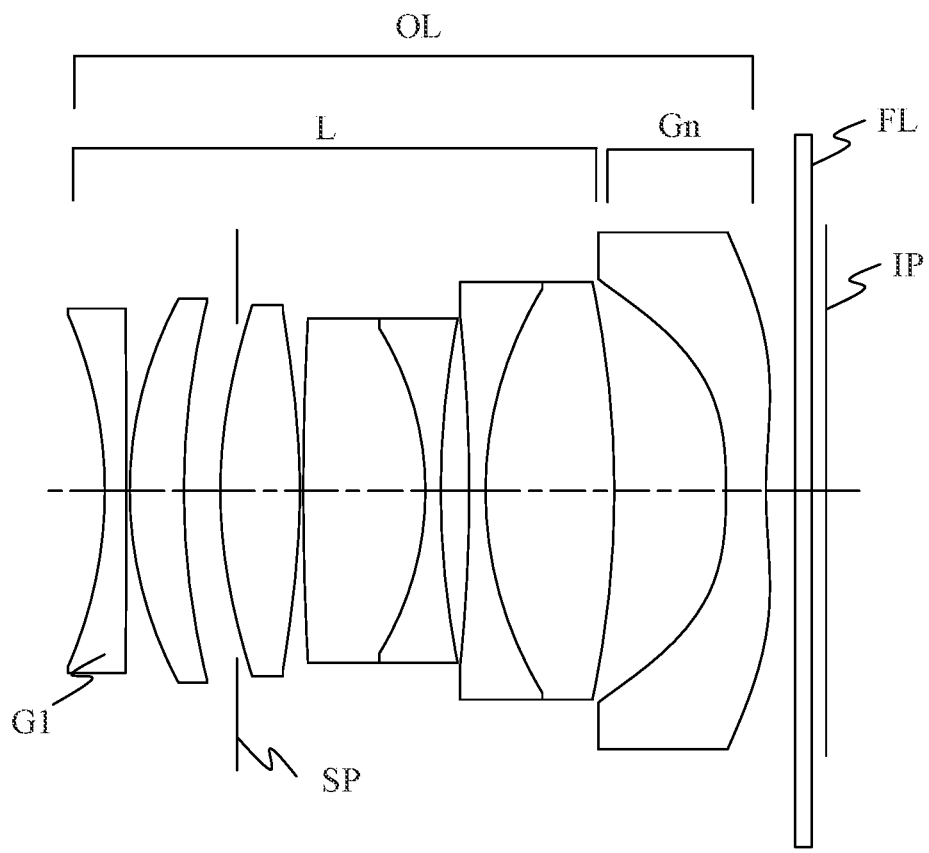
FIG. 1 is a sectional view of an optical system according to Example 1 in an in-focus state at infinity.
Figure 2:
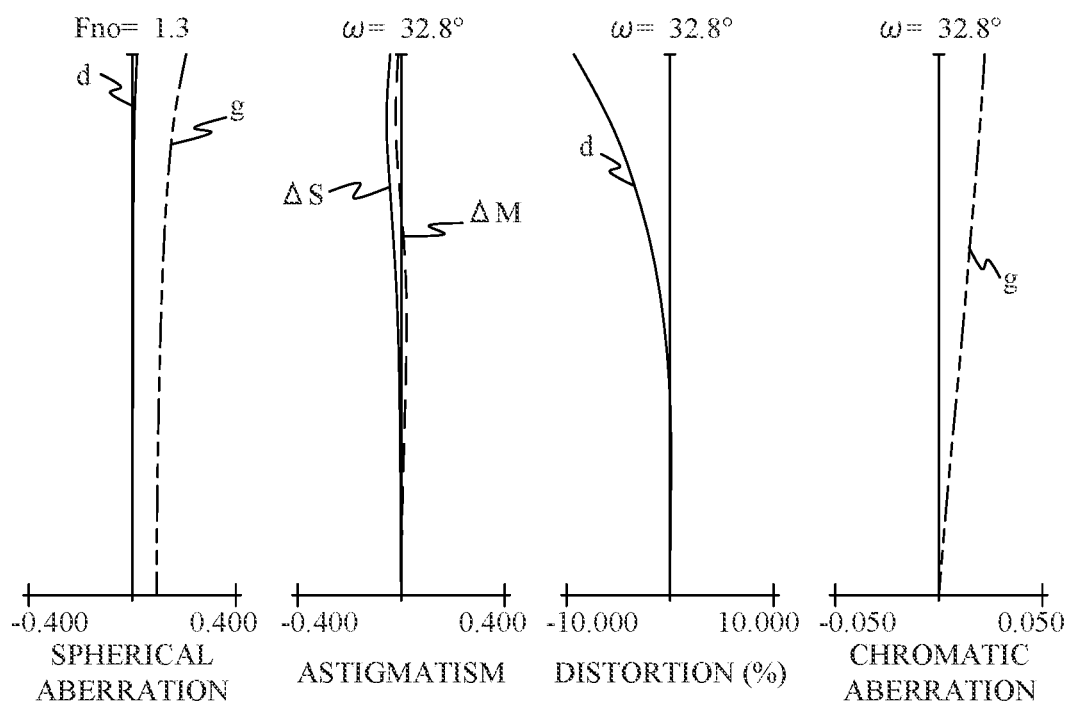
FIG. 2 is an aberration diagram of the optical system according to Example 1 in the in-focus state at infinity.
Figure 3:
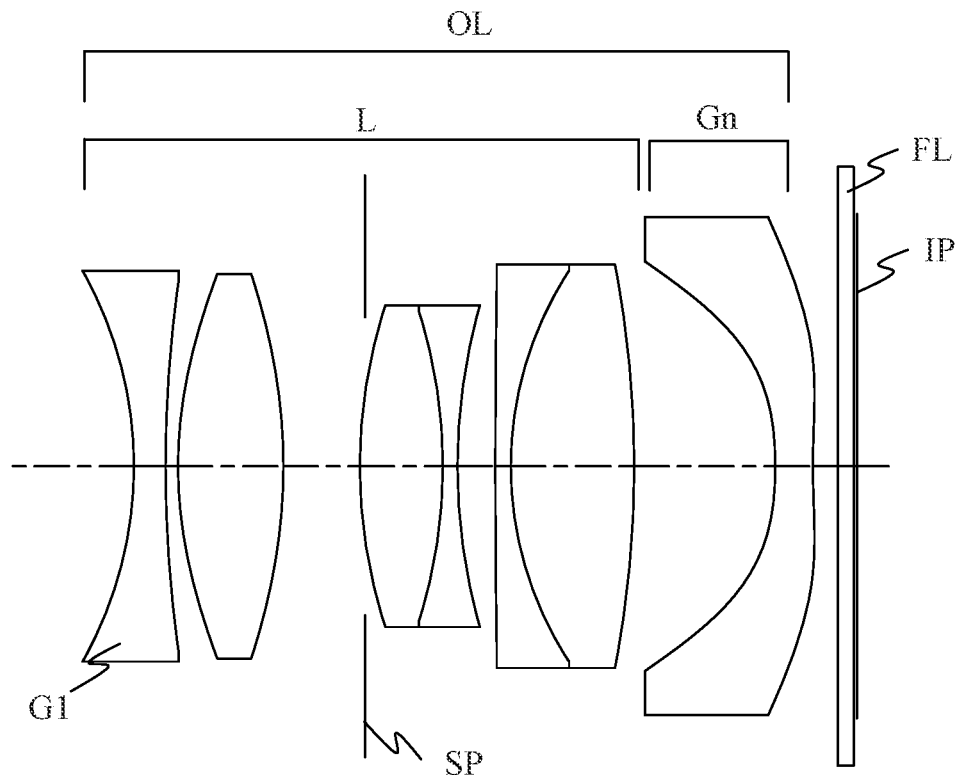
FIG. 3 is a sectional view of an optical system according to Example 2 in an in-focus state at infinity.
Figure 4:
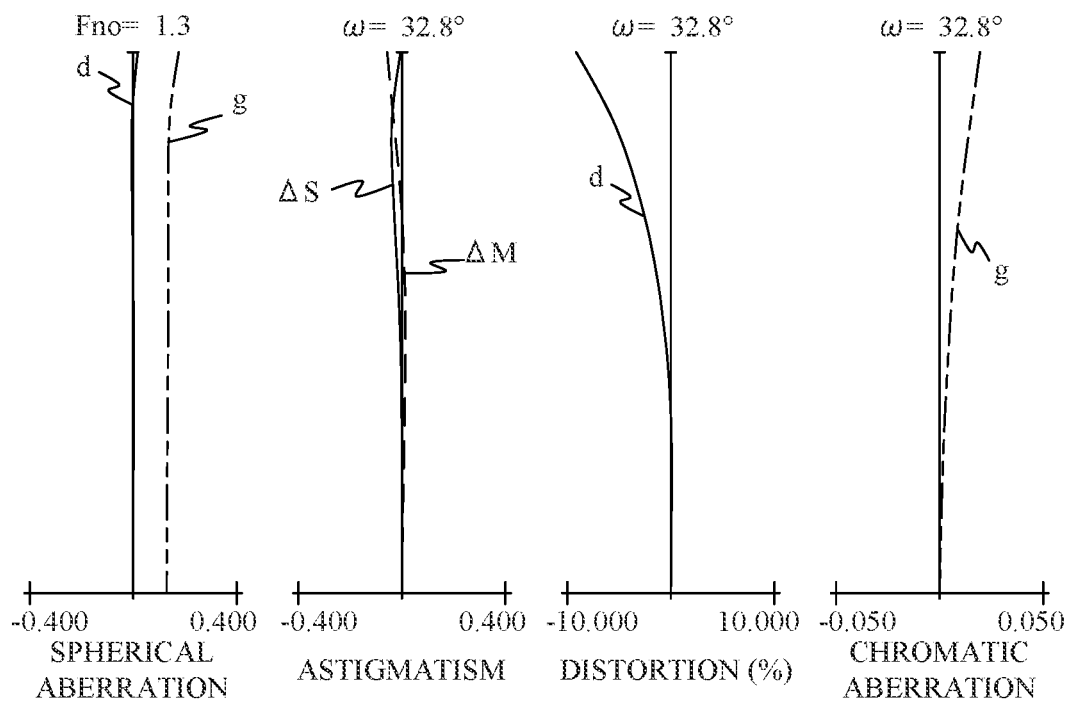
FIG. 4 is an aberration diagram of the optical system according to Example 2 in the in-focus state at infinity.
Figure 5:
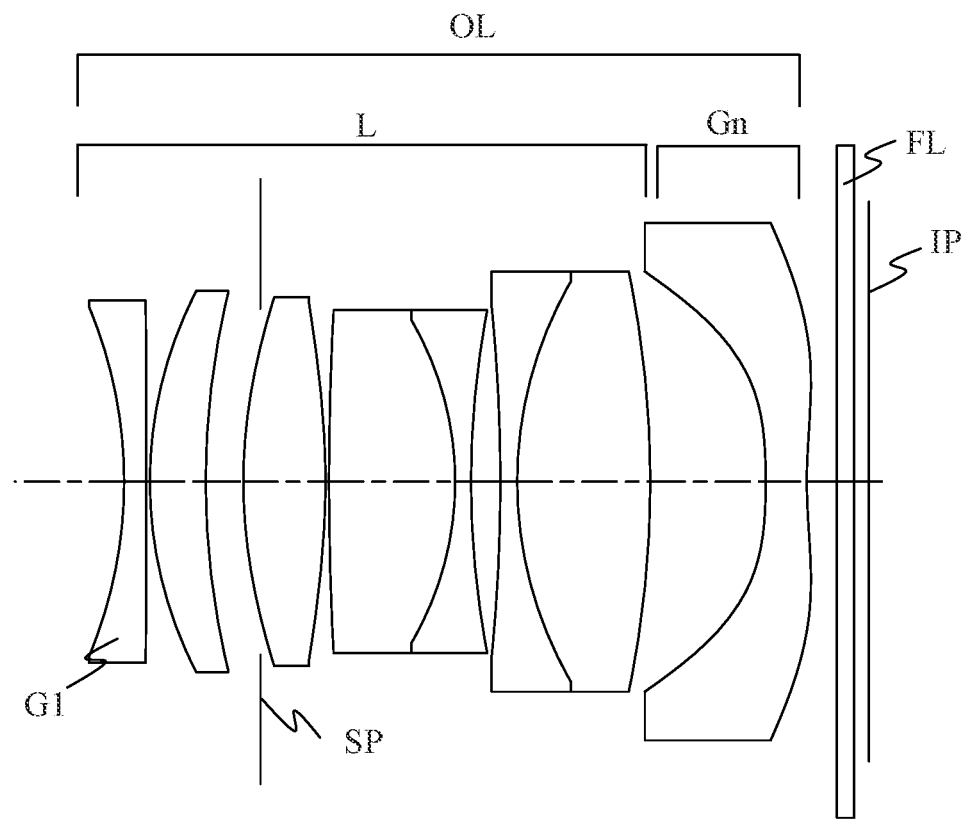
FIG. 5 is a sectional view of an optical system according to Example 3 in an in-focus state at infinity.
Figure 6:
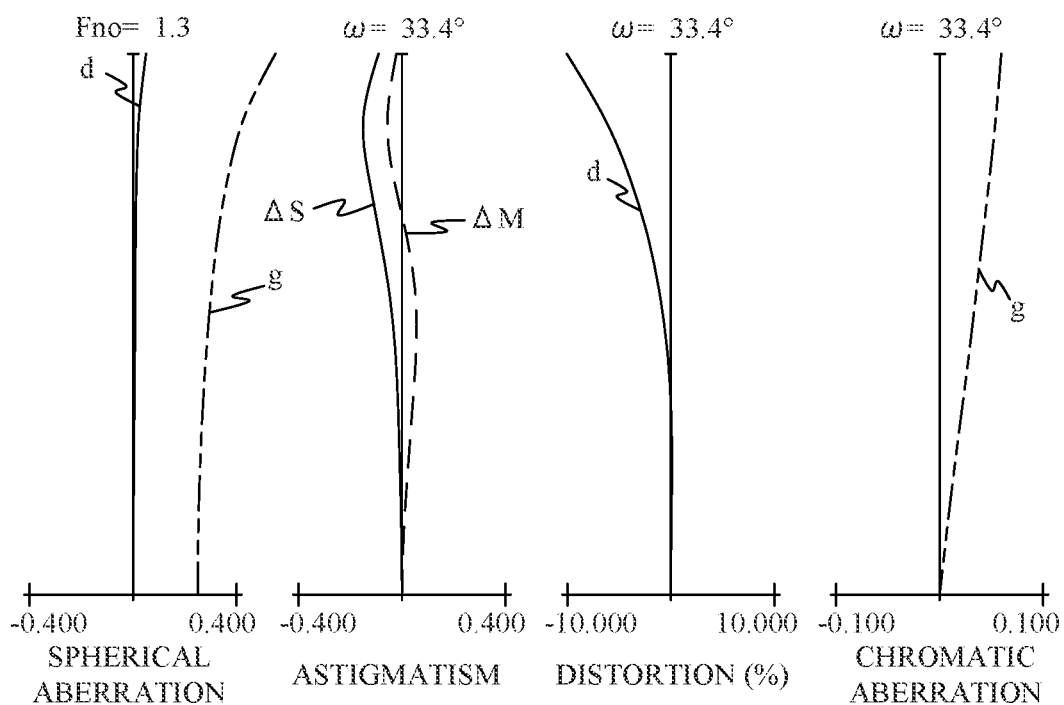
FIG. 6 is an aberration diagram of the optical system according to Example 3 in the in-focus state at infinity.
Figure 7:
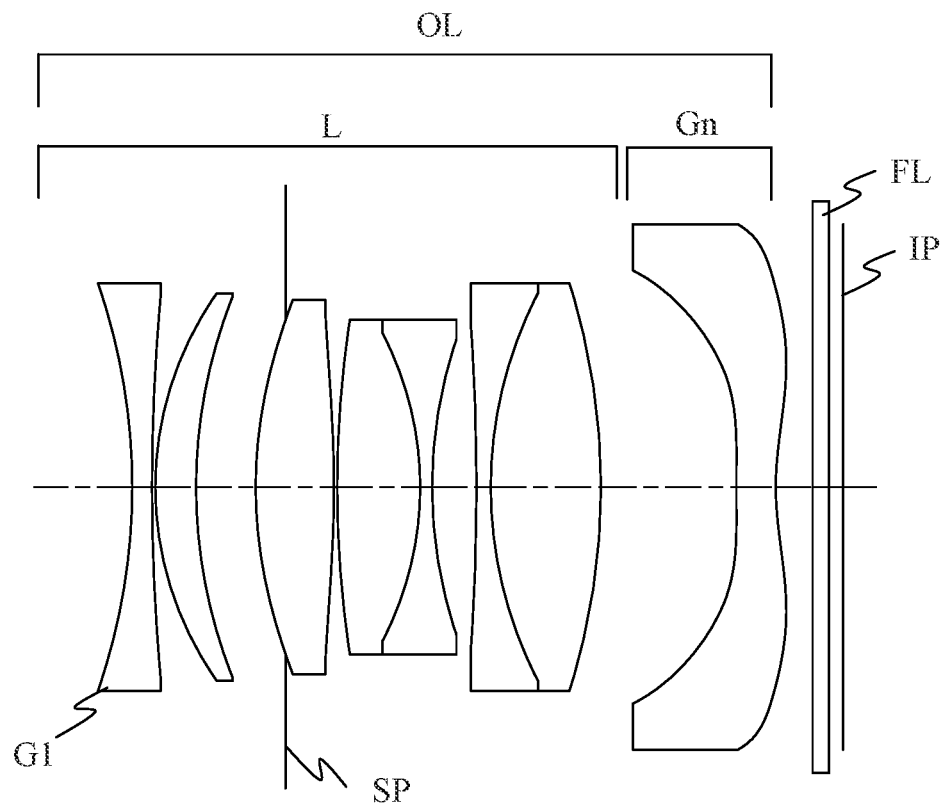
FIG. 7 is a sectional view of an optical system according to Example 4 in an in-focus state at infinity.
Figure 8:
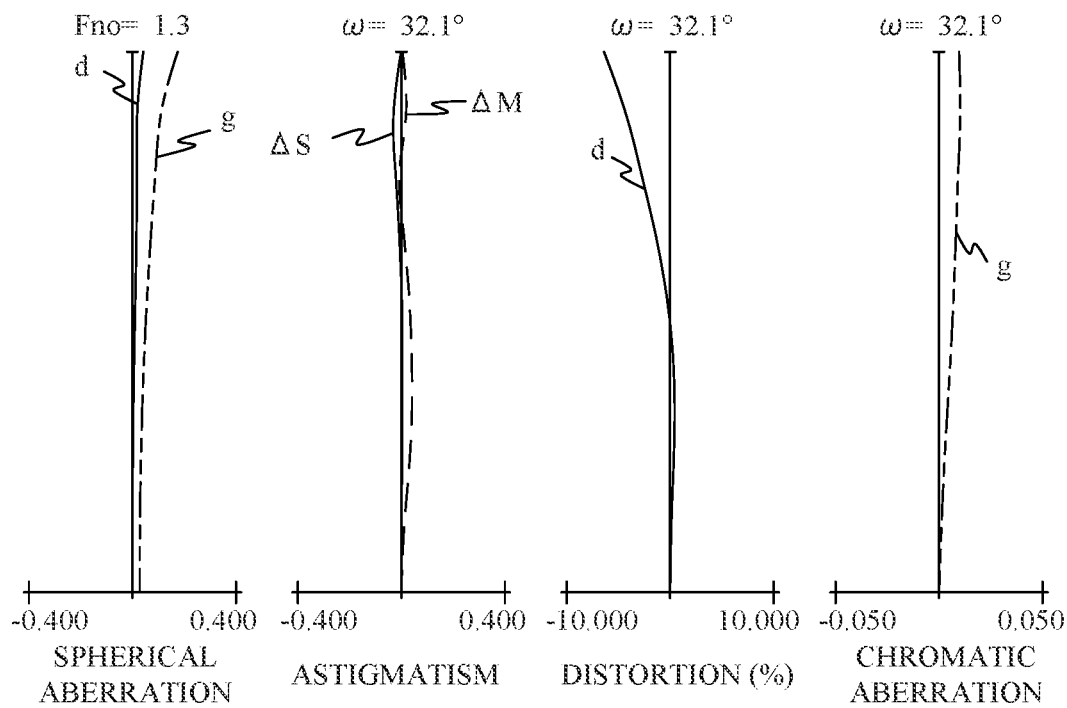
FIG. 8 is an aberration diagram of the optical system according to Example 4 in the in-focus state at infinity.

Referring now to the accompanying drawings, a description will be given of examples according to the disclosure.

FIGS. 1, 3, 5, 7, and 9 are sectional views of optical systems according to Examples 1 to 5 in in-focus states at infinity (object), respectively.

The optical system according to each example is an optical system for an image pickup apparatus such as a digital video camera, a digital still camera, a broadcasting camera, a film-based camera, a TV camera, a surveillance camera, a night vision camera, and an in-vehicle camera. The optical system according to each example can also be used as a projection optical system for a projection apparatus (projector).

In each lens sectional view, a left side is an object side (front) and a right side is an image side (rear). In each lens sectional view, OL denotes an imaging optical system (optical system).

In each example, the lens unit includes a plurality of lenses. The lens unit may further include an aperture stop (diaphragm).

The optical system OL according to each example includes, in order from the object side to the image side, a lens unit L including a plurality of lenses and a final lens Gn having a negative refractive power (where an optical power is a reciprocal of a focal length).

In each example, focusing may be performed by moving all or part of the lenses of the optical system OL in the optical axis direction according to an object distance. In each example, no focusing mechanism may be provided in a case where the optical system OL uses a pan focus lens.

In each lens sectional view. SP denotes an aperture stop that determines (restricts) a light beam (luminous flux) of an open F-number (Fno). IP denotes an image plane, and in a case where the optical system OL according to each example is used as an imaging optical system for a digital still camera or a digital video camera, an imaging plane of a solid-state image sensor (photoelectric conversion element) such as a CCD sensor or a CMOS sensor is placed on the image plane IP. In a case where the optical system OL according to each example is used as an imaging optical system of a film-based camera, a photosensitive surface corresponding to a film plane is placed on the image plane IP. FL denotes an optical block corresponding to an optical filter, a face plate, a low-pass filter, an infrared cut filter, a sensor protective glass, and the like.

FIGS. 2, 4, 6, 8, and 10 are aberration diagrams of the optical systems OL according to Examples 1 to 5 in the in-focus states at infinity, respectively.

In a spherical aberration diagram. Fno denotes an F-number and spherical aberration amounts for the d-line having the wavelength of 587.6 nm and the g-line having the wavelength of 435.8 nm are illustrated. In an astigmatism diagram, ΔS denotes an astigmatism amount on a sagittal image plane, and ΔM denotes an astigmatism amount on a meridional image plane. A distortion diagram illustrates a distortion amount for the d-line. A chromatic aberration diagram illustrates a chromatic aberration amount for the g-line. ω is an imaging half angle of view (°), which is an angle of view based on a ray tracing value.

Next follows a description of a characteristic configuration of the optical system according to each example.

The optical system OL according to each example includes, in order from the object side to the image side, the lens unit L including the plurality of lenses, and the final lens Gn having the negative refractive power. A lens surface on the image side of the final lens Gn has an aspherical shape including a concave area near the optical axis and an inflection point.

The optical system OL according to each example satisfies the following inequality (1).

$$1.780 < Nd < 2.500 \qquad (1)$$

where Nd is an average value of refractive indexes of all lenses included in the lens unit L.

The optical system OL according to each example includes, in order from the object side to the image side, the lens unit L and the final lens Gn having the negative refractive power. Thereby, in the optical system OL according to each example, the aberrations generated in the lens unit L can be corrected by the final lens Gn. In order to reduce the size of the optical system OL, particularly to shorten the overall length, it is effective to use a glass material having a high refractive index for each lens constituting the lens unit L. By using the glass material having the high refractive index for each lens, a curvature of each lens can be made gradual and an overall length can be shortened. When the glass material having the high refractive index is used for a lens having a negative refractive power constituting the lens unit L for miniaturization, a positive Petzval sum increases (curvature of field is large and generated on an underexposure side). In a case where the lens surface on the image side of the final lens Gn is made concave near the optical axis on the image side, the negative refractive power becomes stronger, and the positive Petzval sum generated in the lens unit L can be corrected.

The lens surface on the image side of the final lens Gn has the inflection point. Where x is a displacement amount from a surface vertex in the optical axis direction, h is a height from a direction (diameter direction) orthogonal to the optical axis, and x(h) is an aspheric shape, the inflection point is a point at which a value of a second derivative, x(h) differentiated by h twice, is 0, and the sign of the second derivative changes before and after that point. That is, the inflection point means a point at which a surface shape switches from a concave shape to a convex shape or from a convex shape to a concave shape. Since the lens surface on the image side of the final lens Gn has the inflection point, the peripheral refractive power can be determined independently of the paraxial refractive power, so that curvature of field can be easily corrected. Moreover, an incident angle of a light ray passing through the optical system OL on the imaging plane (image sensor) can be restrained from increasing. The inflection point can be disposed at an arbitrary position radially outside the optical axis as long as it is within the effective diameter of the lens surface on the image side of the final lens Gn. The inflection point may be disposed at the peripheral portion of the lens surface on the image side of the final lens Gn.

The inequality (1) defines the average value of the refractive indexes of all the lenses included in the lens unit L. In a case where the value is higher than the upper limit of the inequality (1), it becomes difficult to mold the lens. In a case where the value is lower than the lower limit of the inequality (1), the average refractive index of the lenses constituting the lens unit L becomes small, and the curvature for securing the refractive power becomes steep. Thereby, the overall length of the lens unit L is increased in order to secure the edge thickness and the lens spacing, and the lens unit L consequently becomes larger.

The numerical range of the inequality (1) may be replaced with a range of the following inequality (1a).

$$1.782 < Nd < 2.000 \qquad (1a)$$

The numerical range of the inequality (1) may be replaced with a range of the following inequality (1b):

$$1.783 < Nd < 1.850 \qquad (1b)$$

This configuration can provide a compact optical system with good optical performance from the center to the periphery of the angle of view while securing a large aperture diameter.

Next follows a description of a configuration which the optical system OL according to each example may satisfy.

The lens unit L may include the aperture stop SP. This configuration facilitates the miniaturization of the lens unit L.

The lens surface on the image side of the final lens Gn may have the aspherical shape including the concave area near the optical axis and an extremal point. Where x is a displacement amount from the surface vertex in the optical axis direction, h is a height from the direction orthogonal to the optical axis (diameter direction), and x(h) is an aspheric shape, the extremal point is a point at which a value of a first derivative, x(h) differentiated by h once, becomes 0. That is, the extreme point means a point on an aspheric surface such that a tangent plane of that point is a plane orthogonal to the optical axis. It may be a saddle point instead of the extremal point. This configuration can provide high-resolution performance from the center to the periphery of the angle of view by satisfactorily correcting curvature of field while suppressing distortion. The extremal point can be disposed at an arbitrary position radially outside the optical axis as long as it is within an effective diameter of the lens surface on the image side of the final lens Gn.

The lens unit L may include a lens G1 having a negative refractive power closest to the object. This configuration can reduce the size of the front lens of the optical system OL. As illustrated in Example 5, a lens having a positive refractive power may be further disposed on the object side of the lens G1.

The lens unit L may include at least six lenses. Reducing the power of each lens can easily suppress various aberrations such as spherical aberration generated in the lens unit L.

Next follows a description of conditions which the optical system OL according to each example may satisfy. The optical system OL according to each example may satisfy one or more of the following inequalities (2) to (13).

$$0.05 < skd/TL < 0.15 \quad (2)$$

$$0.10 < skd/Hmax < 0.30 \quad (3)$$

$$1.0 < TL/D < 2.0 \quad (4)$$

$$0.3 < R2Gn/f < 3.0 \quad (5)$$

$$1.0 < |fGn/f| < 1.8 \quad (6)$$

$$7.0 < EA/skd < 13.0 \quad (7)$$

$$0.50 < TL/DL < 0.95 \quad (8)$$

$$1.45 < NdGn < 1.65 \quad (9)$$

$$1.75 < Ndn < 2.50 \quad (10)$$

$$0.60 < fL/f < 0.95 \quad (11)$$

$$5° < |\Theta f| < 65° \quad (12)$$

$$5° < |\Theta r| < 65° \quad (13)$$

Here, skd is a distance on the optical axis from the lens surface (final lens surface) on the image side of the final lens Gn to the image plane IP while the optical system OL is in the in-focus state at infinity. TL is a distance on the optical axis from the aperture stop SP to the image plane IP while the optical system OL is in the in-focus at infinity. Hmax is a maximum image height in the image plane IP. D is an aperture diameter of the aperture stop SP. R2Gn is a paraxial radius of curvature of the lens surface on the image side of the final lens Gn. f is a focal length of the optical system OL. fGn is a focal length of the final lens Gn. EA is an effective diameter of the final lens Gn. DL is an overall optical length of the optical system OL while the optical system OL is in the in-focus state at infinity (distance on the optical axis from the lens surface closest to the object to the image plane IP). NdGn is a refractive index of the final lens Gn. Ndn is a refractive power of the lens having the highest negative refractive power (or the largest absolute value of the refractive power) among the lenses having negative refractive powers included in the lens unit L. fL is a focal length of the lens unit L. Θf is an angular aperture (°) of the lens surface on the object side of the final lens Gn. Θr is an angular aperture (°) of the lens surface on the image side of the final lens Gn.

In skd, TL, and DL, in a case where an optical block FL made of a parallel plate, such as a face plate and an optical filter, is disposed between the final lens surface and the image plane IP, the thickness of the optical block FL employs an air conversion value.

The inequality (2) defines the distance skd on the optical axis from the lens surface on the image side of the final lens Gn to the image plane IP to the distance TL on the optical axis from the aperture stop SP to the image plane IP while the optical system OL is in the in-focus state at infinity. Due to the final lens Gn disposed at a position distant from the aperture stop SP, a light beam converges sufficiently and a diameter of an on-axis light beam becomes small, so that curvature of field and distortion are corrected without affecting spherical aberration. In a case where the value is higher than the upper limit of the inequality (2), the height (absolute value) of the off-axis light ray incident on the final lens Gn becomes too small. Since the on-axis light beam and the off-axis light beam passing through the final lens Gn are not sufficiently separated in the direction orthogonal to the optical axis, it is difficult to correct curvature of field. In a case where the value is lower than the lower limit of the inequality (2), the above correction effect is enhanced, but it becomes difficult to dispose the optical block FL.

The inequality (3) defines the distance skd on the optical axis from the lens surface on the image side of the final lens Gn to the image plane IP while the optical system OL is in the in-focus state at infinity, to the maximum image height Hmax in the image plane IP. In a case where the value is higher than the upper limit of the inequality (3), the height (absolute value) of the off-axis light ray incident on the final lens Gn becomes too small. Since the on-axis light beam and the off-axis light beam passing through the final lens Gn are not sufficiently separated in the direction orthogonal to the optical axis, it is difficult to correct curvature of field. In a case where the value is lower than the lower limit of the inequality (3), the above correction effect is enhanced, but it becomes difficult to dispose the optical block FL.

The inequality (4) defines the distance TL on the optical axis from the aperture stop SP to the image plane IP while the optical system OL is in the in-focus state at infinity, to the aperture diameter D. In a case where the value is higher than the upper limit of the inequality (4), the negative refractive power of the lens unit L becomes too strong, and the overall optical length becomes large. In a case where the value is lower than the lower limit of the inequality (4), the diameter direction becomes larger due to the larger diameter.

The inequality (5) defines the paraxial radius of curvature R2Gn of the lens surface on the image side of the final lens Gn to the focal length f of the optical system OL. In a case where the value is higher than the upper limit of the inequality (5), the correction of curvature of field is insufficient. In a case where the value is lower than the lower limit of the inequality (5), curvature of field is excessively corrected and more astigmatism is generated.

The inequality (6) defines the focal length fGn of the final lens Gn to the focal length f of the optical system OL. In a case where the value is higher than the upper limit of the inequality (6), curvature of field is excessively corrected. In a case where the value is lower than the lower limit of the inequality (6), the correction of curvature of field is insufficient.

The inequality (7) defines the effective diameter EA of the final lens Gn to the distance skd on the optical axis from the lens surface on the image side of the final lens Gn to the image plane IP while the optical system OL is in the in-focus state at infinity. Here, the effective diameter EA means a diameter on a lens surface of one of light beams passing through the lens surface, which one passes through the position most distant from the optical axis in the radial direction (direction orthogonal to the optical axis). One of the lens surface on the object side and the lens surface on the image side of the final lens Gn, which has a larger effective diameter is set to the effective diameter EA of the final lens Gn. The effective diameter EA may be a diameter of a portion where the aspherical shape is formed, or may be an outer diameter of the lens. In a case where the value is higher than the upper limit of the inequality (7), the lens diameter of the final lens Gn becomes large, and the optical system OL becomes large in the radial direction. In a case where the value is lower than the lower limit of the inequality (7), the on-axis light beam and the off-axis light beam passing through the final lens Gn are not sufficiently separated in the direction orthogonal to the optical axis, so that curvature of field and distortion can be corrected at the same time.

The inequality (8) defines the distance TL on the optical axis from the aperture stop SP to the image plane IP while the optical system OL is in the in-focus state, to the overall optical length DL while the optical system OL is in the in-focus state at infinity. Disposing the aperture stop SP closer to the object than the center position of the optical system OL can restrain an incident angle of a light ray passing through the optical system OL on the imaging surface (image sensor) from increasing, and intends to reduce the size of the optical system OL. In a case where the value is higher than the upper limit of the inequality (8), the height of the on-axis light beam passing through the aperture stop SP becomes too high, so that the aperture stop SP becomes large. As a result, the diameter of the optical system OL becomes large. In a case where the value is lower than the lower limit of the inequality (8), an entrance pupil position is separated from the first lens surface of the optical system OL, the effective diameter of the front lens becomes large, and the optical system OL becomes large.

The inequality (9) defines the refractive index NdGn of the final lens Gn in an environment of room temperature of 25 degrees. In a case where the value is higher than the upper limit of the inequality (9), it becomes difficult to mold the lens. In a case where the value is lower than the lower limit of the inequality (9), the angular aperture of the lens surface of the final lens Gn becomes too large.

The inequality (10) defines the refractive index Ndn of the lens having the highest negative refractive power among the lenses having negative refractive powers included in the lens unit L. By using the glass material having the high refractive index for a lens having a large negative refractive power, the curvature can be made gradual and the overall length of the optical system OL can be easily shortened. In a case where the value is higher than the upper limit of the inequality (10), it becomes difficult to mold the lens. In a case where the value is lower than the lower limit of the inequality (10), an average refractive index of the lenses constituting the lens unit L becomes too small, so that the curvature becomes steep in order to secure the refractive power. Thereby, the overall length of the lens unit L becomes large in order to secure the lens spacing, and as a result, the lens unit L becomes large.

The inequality (11) defines the focal length fL of the lens unit L to the focal length f of the optical system OL. In a case where the value is higher than the upper limit of the inequality (11), the refractive power of the lens unit L becomes too small, which makes it difficult to reduce the size of the optical system OL. In a case where the value is lower than the lower limit of the inequality (11), the refractive power of the lens unit L becomes too large, which makes it difficult to correct spherical aberration.

The inequality (12) defines an absolute value of the angular aperture Θf of the lens surface on the object side of the final lens Gn. In order to suppress astigmatism in the final lens Gn, an off-axis ray may enter the lens surface on the object side of the final lens Gn at an angle close to approximately orthogonal to the lens surface. In a case where the value is higher than the upper limit of the inequality (12), it becomes difficult to mold the lens. In a case where the value is lower than the lower limit of the inequality (12), it becomes difficult to suppress astigmatism.

Figure 12:
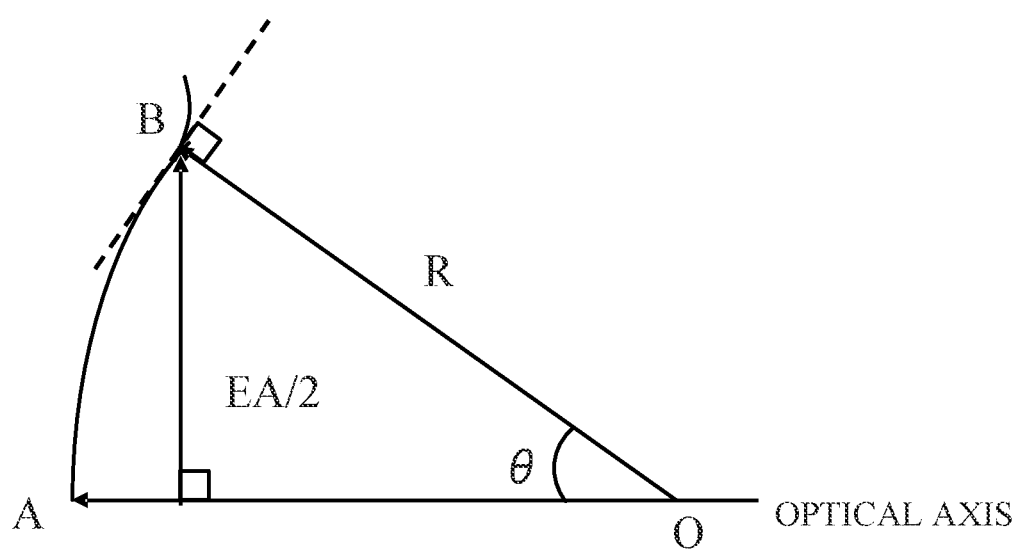
FIG. 12 explains an angular aperture.

Referring now to FIG. 12, a description will be given of a definition of the angular aperture Θ. The angular aperture Θ is expressed by the following expression:

$$\Theta = \angle BOA = \sin^{-1}\{(EA/2)/R\}$$

where an origin O is set to an intersection of a straight line passing through a surface vertex A of a lens having the effective diameter EA and parallel to the optical axis and a normal of a tangential line passing through a position B on the lens surface having the effective diameter EA, and a radius of curvature R of a reference spherical surface is a length of a straight line OB.

Here, the radius of curvature R of the reference spherical surface means a radius of curvature of a spherical surface that passes through the surface vertex and the position B on the lens surface.

The inequality (13) defines an absolute value of the angular aperture Θr of the lens surface on the image side of the final lens Gn. If the value is higher than the upper limit of the inequality (13), it becomes difficult to mold the lens. If the value is lower than the lower limit of the inequality (13), it becomes difficult to suppress an increase of the incident angle of the light ray passing through the optical system OL on the imaging plane (image sensor).

The numerical ranges of the inequalities (2) to (13) may be replaced with ranges of the following inequalities (2a) to (13a):

$$0.06 < skd/TL < 0.14 \tag{2a}$$

$$0.14 < skd/H\,\text{max} < 0.25 \tag{3a}$$

$$1.2 < TL/D < 1.9 \tag{4a}$$

$$0.4 < R2Gn/f < 2.3 \tag{5a}$$

$$1.1 < |fGn/f| < 1.7 \tag{6a}$$

$$7.2 < EA/skd < 12.5 \tag{7a}$$

$$0.55 < TL/DL < 0.90 \tag{8a}$$

$$1.50 < NdGn < 1.60 \tag{9a}$$

$$1.79 < Ndn < 2.00 \tag{10a}$$

$$0.70 < fL/f < 0.94 \tag{11a}$$

$$20° < |\Theta f| < 63° \tag{12a}$$

$$6° < |\Theta r| < 60° \tag{13a}$$

The numerical ranges of the inequalities (2) to (13) may be replaced with ranges of the following inequalities (2b) to (13b):

$$0.07 < skd/TL < 0.13 \tag{2b}$$

$$0.15 < skd/H\,\text{max} < 0.24 \tag{3b}$$

$$1.4 < TL/D < 1.8 \tag{4b}$$

$$0.5 < R2Gn/f < 2.0 \tag{5b}$$

$$1.2 < |fGn/f| < 1.6 \tag{6b}$$

$$7.4 < EA/skd < 12.0 \tag{7b}$$

$$0.64 < TL/DL < 0.88 \tag{8b}$$

$$1.51 < NdGn < 1.58 \tag{9b}$$

$$1.80 < Ndn < 1.98 \tag{10b}$$

$$0.80 < fL/f < 0.93 \tag{11b}$$

$$40° < |\Theta f| < 61° \tag{12b}$$

$$7° < |\Theta r| < 35° \tag{13b}$$

Next follows a detailed description of the optical system OL according to each example.

Each of the optical systems OL according to Examples 1, 2, 3, and 4 illustrated in FIGS. 1, 3, 5, and 7 includes, in order from the object side to the image side, the lens unit L1 and the final lens Gn having the negative refractive power. The lens unit L1 includes, in order from the object side to the image side, a negative lens, a positive lens, the aperture stop SP, a positive lens, a cemented lens of a positive lens and a negative lens, and a cemented lens of a negative lens and a positive lens.

Figure 9:
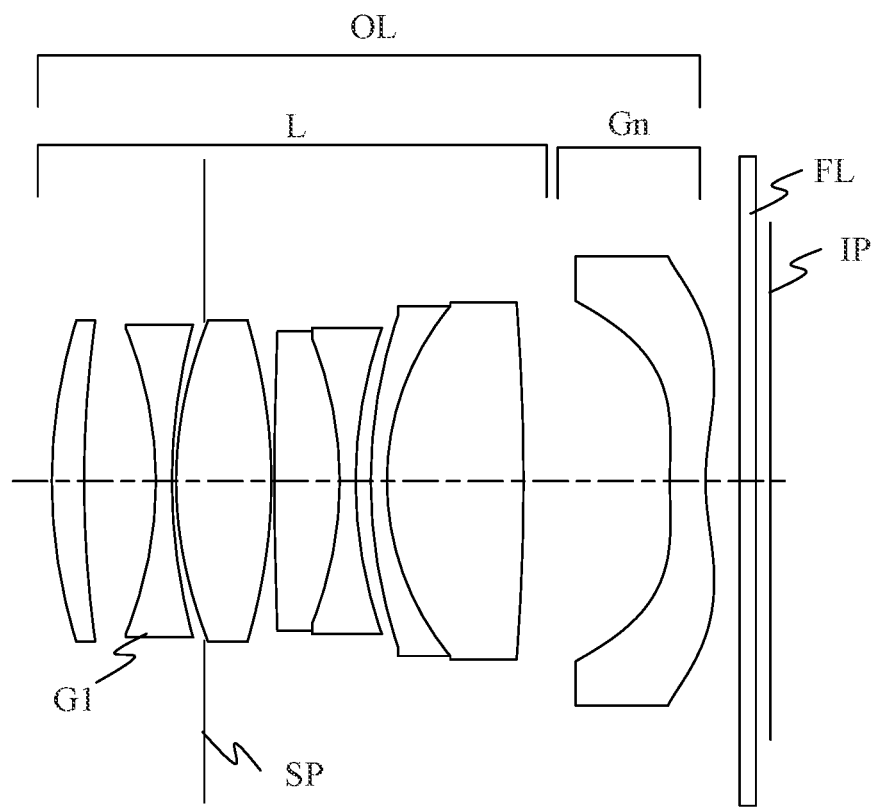
FIG. 9 is a sectional view of an optical system according to Example 5 in an in-focus state at infinity.
Figure 10:
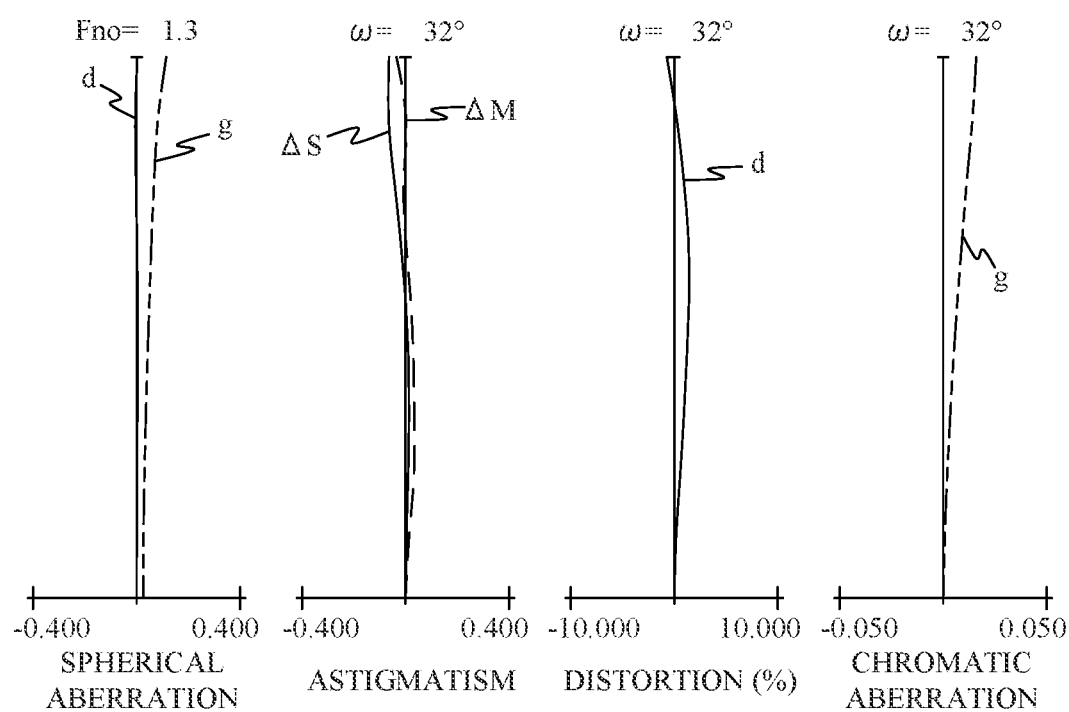
FIG. 10 is an aberration diagram of the optical system according to Example 5 in the in-focus state at infinity.

The optical system OL according to Example 5 illustrated in FIG. 9 includes, in order from the object side to the image side, includes the lens unit L1 and the final lens Gn having the negative refractive power. The lens unit L1 includes, in order from the object side to the image side, a positive lens, a negative lens, the aperture stop SP, a positive lens, a cemented lens of a positive lens and a negative lens, and a cemented lens of a negative lens and a positive lens.

Numerical examples 1 to 5 corresponding to Examples 1 to 5 will be shown below.

In surface data of each numerical example, r represents a radius of curvature of each optical surface, and d (mm) represents an on-axis distance (distance on the optical axis) between an m-th surface and an (m+1)-th surface, where m is the number of a surface counted from the light incident side. nd represents a refractive index of each optical element for the d-line, and vd represents an Abbe number of the optical element. An Abbe number vd of a certain material is expressed as follows:

$$vd=(Nd-1)/(NF-NC)$$

where Nd, NF, and NC are refractive indexes for the d-line (587.6 nm), F-line (486.1 nm), and C-line (656.3 nm) in the Fraunhofer line.

In each numerical example, all of d, focal length (mm), F-number, and half angle of view (°) have values while the optical system according to each example is in the in-focus state at infinity (object). The half angle of view indicates an angle of view calculated by paraxial calculation. A "backfocus" is a distance on the optical axis from the final lens surface (a lens surface closest to the image plane) to the paraxial image plane in terms of air conversion length. An "overall lens length" is a length obtained by adding the backfocus to a distance on the optical axis from the frontmost surface (lens surface closest to the object) of the optical system to the final surface. A "lens unit" includes one or more lenses.

If the optical surface is an aspherical surface, an asterisk * is attached to a right side of a surface number. The aspherical shape is expressed as:

$$X=(h^2/R)/[1+\{1-(1+k)(h/R)^2\}]^{1/2}+A4 \times h^4+A6 \times h^6+A8 \times h^8+A10 \times h^{10}+A12 \times h^{12}$$

where X is a displacement amount from a surface vertex in the optical axis direction, h is a height from the optical axis in the direction orthogonal to the optical axis, R is a paraxial radius of curvature, k is a conical constant, A4, A6, A8, A10, and A12 are aspherical coefficients of each order. "e±XX" in each aspherical coefficient means "×10^{±XX}."

Numerical Example 1

UNIT: mm

Surface Data

| Surface No. | r | d | nd | vd | Effective Diameter |
|---|---|---|---|---|---|
| 1 | −13.230 | 0.65 | 1.56732 | 42.8 | |
| 2 | −556.432 | 0.10 | | | |
| 3 | 12.115 | 1.63 | 2.00100 | 29.1 | |
| 4 | 23.466 | 1.60 | | | |
| 5(Aperture Stop) | ∞ | −0.50 | | | |
| 6* | 14.904 | 2.40 | 1.76802 | 49.2 | |
| 7* | −23.793 | 0.10 | | | |
| 8 | 91.141 | 3.69 | 1.83481 | 42.7 | |
| 9 | −9.345 | 0.46 | 1.95906 | 17.5 | |
| 10 | 26.563 | 0.86 | | | |
| 11 | −51.000 | 0.49 | 1.51742 | 52.4 | |
| 12 | 11.704 | 3.89 | 2.00100 | 29.1 | |
| 13 | −30.167 | 3.37 | | | |
| 14* | −19.774 | 1.20 | 1.53110 | 55.9 | 11.63 |
| 15* | 15.005 | 0.88 | | | 14.46 |
| 16 | ∞ | 0.50 | 1.51633 | 64.1 | |
| 17 | ∞ | 0.43 | | | |
| Image Plane | ∞ | | | | |

Aspheric Data

6th Surface

K = 0.00000e+000 A 4 = −1.13433e−004 A 6 = −1.86886e−007
A 8 = −1.33697e−008

7th Surface

K = 0.00000e+000 A 4 = 1.63863e−004 A 6 = −1.05546e−006
A 8 = −2.97841e−009

14th Surface

K = 0.00000e+000 A 4 = −3.79721e−003 A 6 = 8.71603e−005
A 8 = −7.64087e−007 A10 = −1.93734e−008 A12 = 4.17224e−010

15th Surface

K = 0.00000e+000 A 4 = −2.85274e−003 A 6 = 7.79552e−005
A 8 = −1.39826e−006 A10 = 1.42733e−008 A12 = −6.07417e−011

| | |
|---|---|
| Focal Length: | 12.39 |
| FNO | 1.30 |
| Half Angle of View (°): | 32.84 |
| Image Height | 8.00 |
| Overall lens length | 21.75 |

Numerical Example 2

UNIT: mm

Surface Data

| Surface No. | r | d | nd | vd | Effective Diameter |
|---|---|---|---|---|---|
| 1 | −12.600 | 1.00 | 1.65412 | 39.7 | |
| 2* | 41.811 | 0.39 | | | |
| 3* | 13.558 | 3.34 | 1.85135 | 40.1 | |
| 4* | −17.486 | 2.58 | | | |
| 5(Aperture Stop) | ∞ | −0.16 | | | |
| 6 | 16.386 | 2.64 | 1.77250 | 49.6 | |
| 7 | −16.237 | 0.46 | 1.95906 | 17.5 | |
| 8 | 18.692 | 1.20 | | | |
| 9 | 364.889 | 0.49 | 1.51742 | 52.4 | |
| 10 | 11.336 | 3.91 | 1.95375 | 32.3 | |
| 11 | −33.666 | 4.46 | | | |
| 12* | −13.170 | 1.20 | 1.53110 | 55.9 | 11.81 |

-continued

UNIT: mm

| | | | | | |
|---|---|---|---|---|---|
| 13* | 23.204 | 0.79 | | | 14.62 |
| 14 | ∞ | 0.50 | 1.51633 | 64.1 | |
| 15 | ∞ | 0.11 | | | |
| Image Plane | ∞ | | | | |

Aspheric Data

3rd Surface

K = 0.00000e+000 A 4 = −1.35241e−004 A 6 = −8.30587e−007
A 8 = 1.45600e−008
4th Surface K = 0.00000e+000 A 4 = 7.04830e−005 A 6 = −1.17794e−006
A 8 = 1.90580e−008
12th Surface K = 0.00000e+000 A 4 = −3.51146e−003 A 6 = 1.08913e−004
A 8 = −2.33209e−006 A10 = 2.61924e−008 A12 = −7.96411e−011
13th Surface K = 0.00000e+000 A 4 = −2.55539e−003 A 6 = 6.82893e−005
A 8 = −1.03255e−006 A10 = 8.08461e−009 A12 = −2.43705e−011

| | |
|---|---|
| Focal Length: | 12.40 |
| FNO | 1.30 |
| Half Angle of View (°): | 32.83 |
| Image Height | 8.00 |
| Overall lens length | 22.91 |

Numerical Example 3

UNIT: mm

Surface Data

| Surface No. | r | d | nd | vd | Effective Diameter |
|---|---|---|---|---|---|
| 1 | −34.982 | 1.72 | 1.56732 | 42.8 | |
| 2 | −1471.329 | 0.26 | | | |
| 3 | 32.035 | 4.31 | 2.00100 | 29.1 | |
| 4 | 62.050 | 4.23 | | | |
| 5(Aperture Stop) | ∞ | −1.32 | | | |
| 6* | 39.410 | 6.35 | 1.76802 | 49.2 | |
| 7* | −62.914 | 0.26 | | | |
| 8 | 240.996 | 9.76 | 1.83481 | 42.7 | |
| 9 | −24.711 | 1.22 | 1.95906 | 17.5 | |
| 10 | 70.238 | 2.27 | | | |
| 11 | −134.854 | 1.30 | 1.51742 | 52.4 | |
| 12 | 30.947 | 10.29 | 2.00100 | 29.1 | |
| 13 | −79.769 | 8.91 | | | |
| 14* | −52.288 | 3.17 | 1.53110 | 55.9 | 30.75 |
| 15* | 39.677 | 2.33 | | | 38.24 |
| 16 | ∞ | 1.32 | 1.51633 | 64.1 | |
| 17 | ∞ | 1.15 | | | |
| Image Plane | ∞ | | | | |

Aspheric Data

6th Surface

K = 0.00000e+000 A 4 = −6.13545e−006 A 6 = −1.44574e−009
A 8 = −1.47924e−011
7th Surface K = 0.00000e+000 A 4 = 8.86317e−006 A 6 = −8.16501e−009
A 8 = −3.29535e−012
14th Surface K = 0.00000e+000 A 4 = −2.05387e−004 A 6 = 6.74266e−007
A 8 = −8.45397e−010 A10 = −3.06569e−012 A12 = 9.44273e−015

-continued

UNIT: mm

15th Surface

K = 0.00000e+000 A 4 = −1.54301e−004 A 6 = 6.03056e−007
A 8 = −1.54705e−009 A10 = 2.25864e−012 A12 = −1.37472e−015

| | |
|---|---|
| Focal Length: | 32.77 |
| FNO | 1.30 |
| Half Angle of View (°): | 33.43 |
| Image Height | 21.63 |
| Overall lens length | 57.52 |

Numerical Example 4

UNIT: mm

Surface Data

| Surface No. | r | d | nd | vd | Effective Diameter |
|---|---|---|---|---|---|
| 1 | −18.944 | 0.60 | 1.56732 | 42.8 | |
| 2 | 64.073 | 0.10 | | | |
| 3 | 10.234 | 1.24 | 2.00100 | 29.1 | |
| 4 | 15.665 | 2.72 | | | |
| 5(Aperture Stop) | ∞ | −0.91 | | | |
| 6* | 13.321 | 2.38 | 1.85135 | 40.1 | |
| 7* | −38.300 | 0.10 | | | |
| 8 | 33.773 | 2.53 | 1.72916 | 54.7 | |
| 9 | −10.143 | 0.36 | 1.89286 | 20.4 | |
| 10 | 14.000 | 1.36 | | | |
| 11 | −68.406 | 0.43 | 1.51742 | 52.4 | |
| 12 | 12.849 | 3.35 | 1.95375 | 32.3 | |
| 13 | −20.435 | 4.12 | | | |
| 14* | 72.982 | 1.20 | 1.53110 | 55.9 | 12.07 |
| 15* | 9.258 | 1.12 | | | 14.83 |
| 16 | ∞ | 0.50 | 1.51633 | 64.1 | |
| 17 | ∞ | 0.43 | | | |
| Image Plane | ∞ | | | | |

Aspheric Data

6th Surface

K = 0.00000e+000 A 4 = −1.62447e−004 A 6 = −5.91901e−007
A 8 = 4.11336e−008
7th Surface K = 0.00000e+000 A 4 = 1.05526e−004 A6 = 1.20470e−007
A 8 = 3.93658e−008
14th Surface K = 0.00000e+000 A 4 = −3.92508e−003 A 6 = 8.56282e−005
A 8 = −6.61534e−007 A10 = −4.48628e−009
15th Surface K = 0.00000e+000 A 4 = −3.19957e−003 A 6 = 7.24731e−005
A 8 = −1.35769e−006 A10 = 1.87146e−008 A12 = −1.30390e−010

| | |
|---|---|
| Focal Length: | 12.77 |
| FNO | 1.30 |
| Half Angle of View (°): | 32.06 |
| Image Height | 8.00 |
| Overall lens length | 21.62 |

Numerical Example 5

UNIT: mm

Surface Data

| Surface No. | r | d | nd | vd | Effective Diameter |
|---|---|---|---|---|---|
| 1 | 16.592 | 1.00 | 2.00100 | 29.1 | |
| 2 | 35.757 | 2.22 | | | |
| 3 | −12.450 | 0.49 | 1.64769 | 33.8 | |
| 4 | 18.208 | 1.00 | | | |
| 5(Aperture Stop) | ∞ | −0.87 | | | |
| 6* | 12.197 | 2.94 | 1.85135 | 40.1 | |
| 7* | −16.387 | 0.10 | | | |
| 8 | 118.520 | 2.02 | 1.72916 | 54.7 | |
| 9 | −11.807 | 0.49 | 1.80810 | 22.8 | |
| 10 | 14.190 | 0.47 | | | |
| 11 | 16.029 | 0.50 | 1.78472 | 25.7 | |
| 12 | 8.467 | 4.23 | 2.00100 | 29.1 | |
| 13 | −71.075 | 4.53 | | | |
| 14* | 25.229 | 1.10 | 1.53110 | 55.9 | 11.06 |
| 15* | 7.268 | 1.06 | | | 13.81 |
| 16 | ∞ | 0.50 | 1.51633 | 64.1 | |
| 17 | ∞ | 0.45 | | | |
| Image Plane | ∞ | | | | |

Aspheric Data

6th Surface

K = 0.00000e+000 A 4 = −1.14931e−004 A 6 = 4.45417e−007
A 8 = −2.36743e−008

7th Surface

K = 0.00000e+000 A 4 = 5.95842e−005 A 6 = 2.16407e−007
A 8 = −1.41825e−008

14th Surface

K = 0.00000e+000 A 4 = −6.87777e−003 A 6 = 2.46251e−004
A 8 = −7.49558e−006 A10 = 9.35756e−008

15th Surface

K = 0.00000e+000 A 4 = −6.38748e−003 A 6 = 2.48242e−004
A 8 = −7.63309e−006 A10 = 1.27959e−007 A12 = −9.02853e−010

| Focal Length: | 12.80 |
|---|---|
| FNO | 1.30 |
| Half Angle of View (°): | 32.00 |
| Image Height | 8.00 |
| Overall lens length | 22.23 |

Table 1 below summarizes various values in each numerical example.

TABLE 1

| | Ex. 1 | Ex. 2 | Ex. 3 | Ex. 4 | Ex. 5 |
|---|---|---|---|---|---|
| Nd | 1.807 | 1.785 | 1.807 | 1.788 | 1.832 |
| skd | 1.644 | 1.226 | 4.347 | 1.877 | 1.838 |
| TL | 17.604 | 15.426 | 46.548 | 16.788 | 17.341 |
| Hmax | 8.000 | 8.000 | 21.635 | 8.000 | 8.000 |
| D | 10.122 | 9.450 | 26.764 | 10.201 | 9.787 |
| R2Gn | 15.005 | 23.204 | 39.677 | 9.258 | 7.268 |
| fG n | −15.873 | −15.639 | −41.971 | −20.093 | −19.637 |
| f | 12.393 | 12.399 | 32.769 | 12.771 | 12.800 |
| EA | 14.463 | 14.620 | 38.243 | 14.829 | 13.810 |
| DL | 21.584 | 22.743 | 57.072 | 21.452 | 22.055 |
| NdG n | 1.531 | 1.531 | 1.531 | 1.531 | 1.531 |
| Ndn | 1.959 | 1.959 | 1.959 | 1.893 | 1.808 |
| f L | 11.019 | 11.171 | 29.138 | 11.741 | 11.869 |
| \|Θf\| | 55.767* | 58.282* | 55.767* | 41.281* | 54.139* |
| \|Θr\| | 14.387* | 18.023* | 14.387* | 7.988* | 18.718* |
| Inequality (1) | 1.807 | 1.785 | 1.807 | 1.788 | 1.832 |
| Inequality (2) | 0.093 | 0.079 | 0.093 | 0.112 | 0.106 |
| Inequality (3) | 0.205 | 0.153 | 0.201 | 0.235 | 0.230 |
| Inequality (4) | 1.739 | 1.632 | 1.739 | 1.646 | 1.772 |
| Inequality (5) | 1.211 | 1.871 | 1.211 | 0.725 | 0.568 |
| Inequality (6) | 1.281 | 1.261 | 1.281 | 1.573 | 1.534 |
| Inequality (7) | 8.798 | 11.928 | 8.798 | 7.900 | 7.512 |
| Inequality (8) | 0.816 | 0.678 | 0.816 | 0.783 | 0.786 |
| Inequality (9) | 1.531 | 1.531 | 1.531 | 1.531 | 1.531 |
| Inequality (10) | 1.959 | 1.959 | 1.959 | 1.893 | 1.808 |
| Inequality (11) | 0.889 | 0.901 | 0.889 | 0.919 | 0.927 |
| Inequality (12) | 55.767* | 58.282* | 55.767* | 41.281* | 54.139* |
| Inequality (13) | 14.387* | 18.023* | 14.387* | 7.988* | 18.718* |

Image Pickup Apparatus

Figure 11:
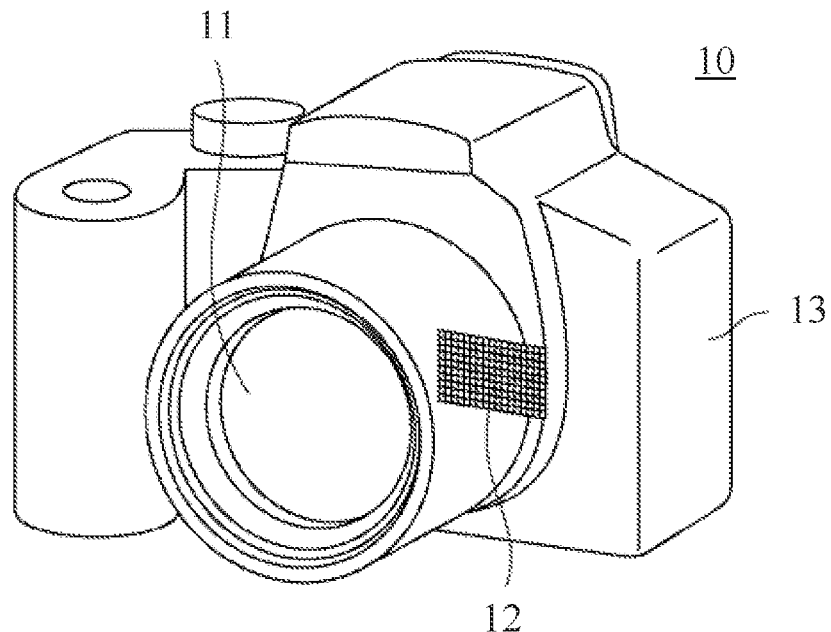
FIG. 11 is a schematic view of main part of an image pickup apparatus that includes the optical systems according to any one of Examples 1 to 5.

Referring now to FIG. 11, a description will be given of an example of a digital still camera (imaging apparatus) using the optical system OL of the disclosure as an imaging optical system. FIG. 11 is a schematic view of main part of a camera 10 (image pickup apparatus) including the optical system of the disclosure. In FIG. 11, reference numeral 13 denotes a camera body, and reference numeral 11 denotes an imaging optical system that is any of the optical systems described in Examples 1 to 5. Reference numeral 12 denotes a solid-state image sensor (photoelectric conversion element) such as a CCD sensor, a CMOS sensor, or a SPAD sensor, which is built in the camera body 13 and receives an object image formed by the imaging optical system 11. The camera body 13 may be a so-called single-lens reflex camera having a quick turn mirror, or a so-called mirrorless camera having no quick turn mirror.

Applying the optical system OL of the disclosure to an image pickup apparatus such as the digital still camera in this way can provide an image pickup apparatus having a small lens.

Each example can provide a compact optical system having a large aperture diameter and good optical performance from the center to the periphery of the angle of view.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-171417, filed on Oct. 20, 2021, which is hereby incorporated by reference herein in its entirety.

What is claimed is:

1. An optical system comprising, a lens unit and a final lens having a negative refractive power disposed on an image side of the lens unit,
   wherein a lens surface on the image side of the final lens has an aspherical shape that includes a concave area near an optical axis of the optical system and an inflection point,
   wherein the lens unit includes two cemented subunits, each cemented subunit being configured by cementing a positive lens and a negative lens, wherein the total number of lenses disposed in the lens unit is seven or more, and wherein the following inequality is satisfied:

$$1.780 < Nd < 2.500$$

where Nd is an average value of refractive indexes of all lenses included in the lens unit.

2. The optical system according to claim 1, wherein the lens unit includes an aperture stop.

3. The optical system according to claim 2, wherein the following inequality is satisfied:

$$0.05 < skd/TL < 0.15$$

where skd is a distance on the optical axis from the lens surface on the image side of the final lens to an image plane while the optical system is in an in-focus state at infinity, and TL is a distance on the optical axis from the aperture stop to the image plane while the optical system is in the in-focus state at infinity.

4. The optical system according to claim 1, wherein the following inequality is satisfied:

$$0.10 < skd/Hmax < 0.30$$

where skd is a distance on an optical axis from the lens surface on the image side of the final lens to an image plane while the optical system is in an in-focus state at infinity, and Hmax is a maximum image height on the image plane.

5. The optical system according to claim 2, wherein the following inequality is satisfied:

$$1.0 < TL/D < 2.0$$

where TL is a distance on an optical axis from the aperture stop to an image plane while the optical system is in an in-focus state at infinity, and D is an aperture diameter of the aperture stop.

6. The optical system according to claim 1, wherein the following inequality is satisfied:

$$0.3 < R2Gn/f < 3.0$$

where R2Gn is a paraxial radius of curvature of the lens surface on the image side of the final lens, and f is a focal length of the optical system.

7. The optical system according to claim 1, wherein the following inequality is satisfied:

$$1.0 < |fGn/f| < 1.8$$

where f is a focal length of the optical system, and fGn is a focal length of the final lens.

8. The optical system according to claim 1, wherein the lens unit includes a lens having a negative refractive power closest to an object.

9. The optical system according to claim 1, wherein the following inequality is satisfied:

$$7.0 < EA/skd < 13.0$$

where skd is a distance on an optical axis from the lens surface on the image side of the final lens to an image plane while the optical system is in an in-focus state at infinity, and EA is an effective diameter of the final lens.

10. The optical system according to claim 2, wherein the following inequality is satisfied:

$$0.50 < TL/DL < 0.95$$

where TL is a distance on an optical axis from the aperture stop to an image plane while the optical system is in an in-focus at infinity, and DL is a distance on the optical axis from a lens surface closest to the object to the image plane while the optical system is in an in-focus at infinity.

11. The optical system according to claim 1, wherein the following inequality is satisfied:

$$1.45 < NdGn < 1.65$$

where NdGn is a refractive index of the final lens.

12. The optical system according to claim 1, wherein the following inequality is satisfied:

$$1.75 < Ndn < 2.50$$

where Ndn is a refractive index of a lens having the largest absolute value among refractive powers of lenses having negative refractive powers included in the lens units.

13. The optical system according to claim 1, wherein the lens surface on the image side of the final lens has an aspherical shape having an extremal point.

14. The optical system according to claim 1, wherein the following inequality is satisfied:

$$0.60 < fL/f < 0.95$$

where f is a focal length of the optical system, and fL is a focal length of the lens unit.

15. The optical system according to claim 1, wherein the following inequality is satisfied:

$$5° < |\Theta f| < 65°$$

where $\Theta f$ is an angular aperture of a lens surface on an object side of the final lens.

16. The optical system according to claim 1, wherein the following inequality is satisfied:

$$40° < |\Theta f| < 61°$$

where $\Theta f$ is an angular aperture of a lens surface on an object side of the final lens.

17. The optical system according to claim 1, wherein the following inequality is satisfied:

$$5° < |\Theta r| < 65°$$

where $\Theta r$ is an angular aperture of the lens surface on the image side of the final lens.

18. The optical system according to claim 1, wherein the inflection point is disposed at a peripheral portion on the lens surface on the image side of the final lens.

19. An image pickup apparatus comprising:

an optical system; and an image sensor configured to receive an image formed by the optical system, wherein the optical system comprises, a lens unit and a final lens having a negative refractive power disposed on an image side of the lens unit, wherein a lens surface on the image side of the final lens has an aspherical shape that includes a concave area near an optical axis of the optical system and an inflection point, wherein the lens unit includes two cemented subunits, each cemented subunit being configured by cementing a positive lens and a negative lens, wherein the total number of lenses disposed in the lens unit is seven or more, and wherein the following inequality is satisfied:

$$1.780 < Nd < 2.500$$

where Nd is an average value of refractive indexes of all lenses included in the lens unit.

* * * * *